(12) United States Patent
Beauchamp et al.

(10) Patent No.: US 12,483,629 B2
(45) Date of Patent: *Nov. 25, 2025

(54) SYSTEMS AND METHODS TO AUTOMATICALLY UPDATE STATUS OF PROJECTS WITHIN A COLLABORATION ENVIRONMENT

(71) Applicant: Asana, Inc., San Francisco, CA (US)

(72) Inventors: Tyler Jeffrey Beauchamp, Bismarck, ND (US); Reyana Fayyaz, San Francisco, CA (US); Jocelyn Karlan Newman, San Francisco, CA (US); Gregory Lilley, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,289

(22) Filed: May 13, 2024

(65) Prior Publication Data

US 2024/0297921 A1    Sep. 5, 2024

Related U.S. Application Data

(63) Continuation of application No. 18/062,998, filed on Dec. 7, 2022, now Pat. No. 12,028,420, which is a
(Continued)

(51) Int. Cl.
*H04L 67/142* (2022.01)
*H04L 67/025* (2022.01)
(Continued)

(52) U.S. Cl.
CPC .......... *H04L 67/142* (2013.01); *H04L 67/025* (2013.01); *H04L 67/1095* (2013.01); *H04L 67/131* (2022.05); *H04L 67/306* (2013.01)

(58) Field of Classification Search
USPC ........................................................ 709/227
See application file for complete search history.

(56) References Cited

U.S. PATENT DOCUMENTS

2006/0190569 A1    8/2006    Neil
2008/0147453 A1    6/2008    Kogan
(Continued)

FOREIGN PATENT DOCUMENTS

CN    101101205 A    1/2008
CN    106330864 A    1/2017
(Continued)

OTHER PUBLICATIONS

Prasetyo et al., "Development of real-time collaboration system for e-book writing", Nov. 1, 2015, IEEE, 2015 International Conference on Information Technology Systems and Innovation (ICITSI) (2015, pp. 1-7) (Year: 2015).*

(Continued)

*Primary Examiner* — Davoud A Zand
(74) *Attorney, Agent, or Firm* — Esplin & Associates, PC

(57) ABSTRACT

Systems and methods to automatically update status of projects within a collaboration environment are described herein. Exemplary implementations may: manage environment state information maintaining a collaboration environment; determine status information for the individual projects; manage information defining project-level graphical user interfaces; update the individual project-level graphical user interfaces to reflect status information of the individual projects in the collaboration environment; and/or perform other operations.

20 Claims, 3 Drawing Sheets

Related U.S. Application Data continuation of application No. 17/244,903, filed on Apr. 29, 2021, now Pat. No. 11,553,045.

(51) Int. Cl.
*H04L 67/1095* (2022.01)
*H04L 67/131* (2022.01)
*H04L 67/306* (2022.01)

(56) References Cited

U.S. PATENT DOCUMENTS

| | | | |
|---|---|---|---|
| 2009/0077422 A1 | 3/2009 | Khaladkar | |
| 2010/0036929 A1 | 2/2010 | Scherpa | |
| 2011/0225293 A1 | 9/2011 | Rathod | |
| 2013/0318589 A1* | 11/2013 | Ford | H04L 63/10 726/7 |
| 2014/0047560 A1* | 2/2014 | Meyer | G06F 21/62 726/28 |
| 2015/0193392 A1 | 7/2015 | Greenblatt | |
| 2017/0257404 A1 | 9/2017 | Barber-Mingo | |
| 2021/0110347 A1* | 4/2021 | Khalil | G06Q 30/08 |
| 2022/0058548 A1* | 2/2022 | Garg | G06Q 10/06375 |
| 2023/0076595 A1 | 3/2023 | Baselga | |
| 2023/0394406 A1 | 12/2023 | Pelz | |
| 2023/0401534 A1 | 12/2023 | Baselga | |
| 2024/0046213 A1 | 2/2024 | Pelz | |
| 2024/0171621 A1 | 5/2024 | Ye | |

FOREIGN PATENT DOCUMENTS

| | | |
|---|---|---|
| CN | 108287786 A | 7/2018 |
| WO | 2015162550 A1 | 10/2015 |
| WO | 2016115154 A1 | 7/2016 |

OTHER PUBLICATIONS

Kerstin S. Haring, "FFAB—The Form Function Attribution Bias in Human-Robot Interaction." 2018, IEEE Transactions on Cognitive and Developmental Systems, vol. 10, No. 4, pp. 841-851. (Year: 2018).

Sheth, A., Kochut, K.J., Workflow Applications to Research Agenda: Scalable and Dynamic Work Coordination and Collaboration Systems. In: Doga-, A., Kalinichenko, L., Ozsu, M.T., Sheth, A. (eds) Workflow Management Systems and Interoperability. NATO ASI Series, vol. 164. (Year: 1998).

Ghiani et al, Personalization of Context-Dependent Applications Through Trigger-Action Rules, ACM Transactions on Computer-Human Interaction vol. 24 Issue 2 Article No. 14 pp. 1-33 (Year: 2017).

Giuseppe Setanni, "A collaborative cyber incident management system for European Interconnected Critical infrastructures" 2017, Journal of Information Security and Applications, 34, pp. 166-182. 1-s2.0-S2214212616300576-main.pdf. (Year: 2017).

Mario Faiella, "Collaborative Attribute Retrieval in Environment with Faulty Attribute Managers." 2016, 11 International Conference on Availability, Reliability and Security, IEEE, pp. 296-303. (Year: 2016).

A. Bilberg, "Digital twin driven human-robot collaborative assembly," 2019, CIRP Annals, Manufacturing Technology, pp. 499-502. (Year: 2019).

* cited by examiner

SYSTEMS AND METHODS TO AUTOMATICALLY UPDATE STATUS OF PROJECTS WITHIN A COLLABORATION ENVIRONMENT

FIELD OF THE DISCLOSURE

The present disclosure relates to systems and methods to automatically update status of projects within a collaboration environment.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner. Projects are a way to organize groups of tasks. Interaction by a user or team of users with tasks that make up a project may be a way to gauge progress toward completion of the project.

SUMMARY

One aspect of the present disclosure relates to a system configured to automatically update status of projects within a collaboration environment. Keeping track of activities by users, or a team of users, with respect to units of work that make up a project may be time consuming and cumbersome. One or more implementations presented herein propose presenting a user interface with a status update reflecting progress toward completion of an individual project. Rather than having users estimate the progress towards completion of a project, activities within the collaboration environment that impact the progress may be monitored. Occurrences of these activities in the collaboration environment may impact values of a status parameter of an individual project. Based on the values of the status parameter, individual project-level graphical user interfaces may be automatically updated. The user interfaces may thereby visually show the progress toward completion of an individual project. In some implementations, the monitoring may prompt users with recommendations to update the status parameter manually to reflect their activities.

One or more implementations of a system to automatically update status of projects within a collaboration environment may include one or more hardware processors configured by machine-readable instructions and/or other components. Executing the machine-readable instructions may cause the one or more hardware processors to facilitate automatically updating status of projects within a collaboration environment. The machine-readable instructions may include one or more computer program components. The one or more computer program components may include one or more of an environment state component, a status component, a user interface component, an update component, and/or other components.

The environment state component may be configured to manage environment state information maintaining a collaboration environment and/or other information. The collaboration environment may be configured to facilitate interaction by users with the collaboration environment. The environment state information may define one or more of work unit records, project records, and/or other records. The work unit records may include work information comprising values of work unit parameters defining units of work managed, created, and/or assigned to the users within the collaboration environment. The project records may include project information comprising values for project parameters associated with projects managed within the collaboration environment. The project parameters may include a status parameter. An individual project may include an individual set of the units of work.

The status component may be configured to determine status information for the individual projects. The status information may include values of the status parameter of the individual projects. The status parameter may characterize status of the individual projects. By non-limiting illustration, the status of the individual projects may be characterized by activities that impact progress toward completion of the individual projects.

The environment state component may be configured to manage information defining project-level graphical user interfaces of the collaboration environment. The individual project-level graphical user interfaces may correspond to individual projects. The individual project-level graphical user interfaces may include individual sets of interface elements displaying the values of one or more of the project parameters of the individual projects. By way of non-limiting illustration, a first project-level graphical user interface may be associated with a first project.

The update component may be configured to update the individual project-level graphical user interfaces to reflect the values of the status parameter of the individual projects. The update of the user interface may be in response to occurrences of the activities that impact the progress toward completion of the individual projects and/or other information.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
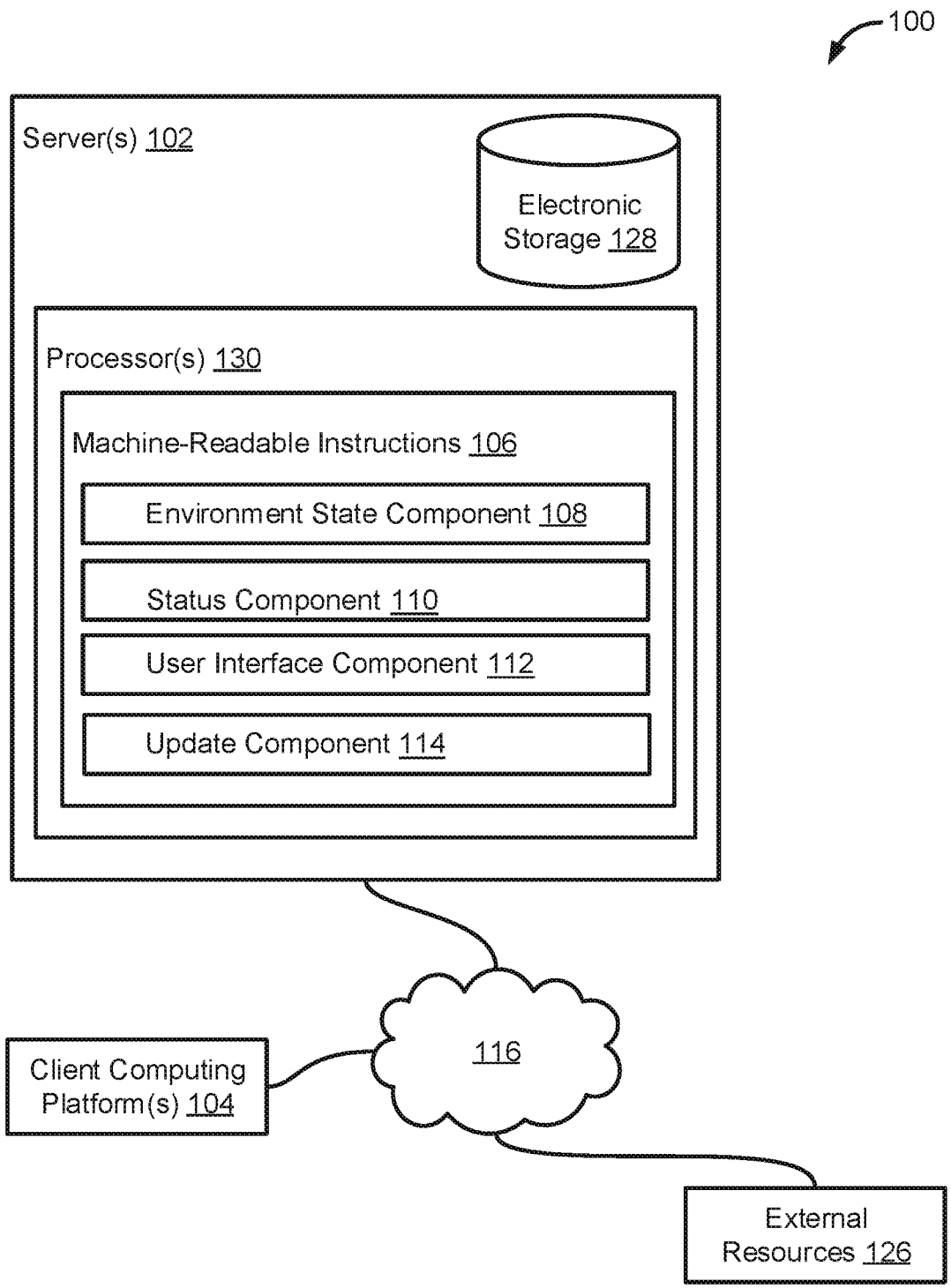
FIG. 1 illustrates a system configured to automatically update status of projects within a collaboration environment, in accordance with one or more implementations.

FIG. 1 illustrates a system 100 configured to automatically update status of projects within a collaboration environment, in accordance with one or more implementations. Manually keeping track of activities by users, or a team of users, with respect to units of work that make up a project may be time consuming and cumbersome. One or more implementations of the system 100 may be configured to present project-level graphical user interfaces with a status update reflecting progress toward completion of individual projects. Rather than having users estimate the progress towards completion of a project, activities within the collaboration environment that impact the progress may be monitored. Occurrences of these activities in the collaboration environment may impact values of a status parameter of an individual project. Based on the values of the status parameter, the project-level graphical user interfaces may be automatically updated to reflect the progress toward completion.

In some implementations, system 100 may include one or more of one or more servers 102, one or more client computing platforms 104, external resource(s) 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate automatically updating status of projects within a collaboration environment. The computer program components may include one or more of an environment state component 108, a status component 110, a user interface component 112, an update component 114, and/or other components.

Environment state component 108 may be configured to manage environment state information and/or other information used in maintaining a collaboration environment. The collaboration environment may be configured to facilitate interaction by users within the collaboration environment. The environment state information may include one or more of user records, work unit records, project records, objective records, and/or other records. The user records may include user information comprising values of user parameters. The work unit records which may include work information comprising values for work unit parameters associated with units of work managed, created, and/or assigned within the collaboration environment. The project records may include project information including values for project parameters associated with projects managed within the collaboration environment. An individual project may include an individual set of the units of work.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc. . . . ), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The roles of the users within the units of work and/or the projects may be specified separately from roles specified with respect to a business organization as a whole.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of work unit parameters may include one or more of a unit of work name, a unit of work description, one or more unit of work dates (e.g., a start date, a due date or end date, a completion date, and/or dates), one or more members associated with a unit of work (e.g., an owner, one or more other project/task collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be representing in a calendar view by user interface elements (e.g., icons, calendar entries, etc.).

Project information in project records may define values of project parameters for projects managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

In some implementations, activities that impact the progress toward completion of the individual projects may be reflected by changes in the values of one or more of the work unit parameters and/or the values of one or more of the project parameters. The one or more of the work unit parameters may include a work creation parameter characterizing the creation of the individual units of work. A work assignment parameter may characterize assignments to individual users. A work completion parameter may characterize completion status of the individual units of work. The one or more of the project parameters may include a project name parameter, a project description parameter, a resource parameter, a status parameter, and/or other parameters.

The values of the project parameters may, by way of non-limiting example, include one or more of: one or more units of work within individual ones of the projects (which may include values of work unit parameters defined by one or more work unit records), status information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The status component 110 may be configured to determine status information for the individual projects. The status information may include values of a status parameter of the individual projects. The status parameter may characterize status of the individual projects. In some implementations, the status of the individual projects may be characterized by activities that impact progress toward completion of the individual projects. Accordingly, the values of the status parameter may include descriptions of the activities that impact progress toward completion of the individual projects and/or other information. The status component 110 may be configured to monitor the collaboration environment for the activities that impact progress toward completion of the individual projects.

In some implementations, the activities that impact the progress toward completion of the individual projects may be determined based on monitoring change in values of work unit parameters of units of work that make up the individual projects, and/or other information. By way of non-limiting illustration, activities may include one or more of completing individual units of work, creating units of work, uploading assets to individual units of work, assigning start dates and/or due dates to the individual units of work, adding one or more units of work to an individual project, assigning one or more users to one or more units of work within the individual projects, updating a description of the individual projects and/or individual unit of work, assigning one or more users one or more roles within the individual projects at the project level, and/or other activities. In some implementations, individual users may be identified as associated with the activities that impact progress toward completion of the individual projects.

The change in values of work unit parameters of units of work that make up the individual projects and reflect activities that impact the progress toward completion may include one or more of user-initiated change, automated change, and/or other changes. Automated change may be associated with rules within the collaboration environment that cause actions to be effectuated in response to occurrence of trigger events. Change may be measured based on one or more of quantity of change, frequency of change, character of changes, and/or other information. The character of change may refer to change from one specific value to another specific value. By way of non-limiting illustration, user-initiated change may be shown based on a user marking a unit of work from "incomplete" to "marked complete." By way of non-limiting illustration, automated change may be shown based on a user uploading an asset to a unit of work, which triggers an automatic change in the unit of work from being "incomplete" to "completed."

In some implementations, some activities may indirectly impact the progress toward completion of individual projects. By way of non-limiting illustration, activities that may indirectly impact the progress toward completion may include one or more of viewing, commenting, sharing, tagging, and/or other activities. These activities may not directly impact the completion of units of work but may still reflect that users are active within the collaboration environment such that progress may be apparent. Viewing may refer to navigation to a project page displaying a project and/or work unit pages of units of work included in the project. Commenting may include add text, emoticons, and/or other content information comments sections, threads, and/or messages boards. Sharing may include providing links to individual project pages and/or individual units of work. Tagging may include mentioning individual users (e.g., via an "@" symbol pointer to users by username).

In some implementations, one or more activities that impact progress toward completion of the individual projects may be weighted. In some implementations, the weighting may be a workload weighting, and/or other metric to weight the activities. Workload of an activity may comprise a metric which conveys an extent in which the activity impacts the progress toward completion. The extent in which the activity impacts the progress may be based on one or more of an amount of time to complete the activity, a difficulty of the activity, an effort of the activity, and/or other measures. An activity that impacts the progress relatively more than an other activity may be weighted relatively higher than the other activity. By way of non-limiting illustration, a first activity of drafting a ten page document may require more time and/or effort than a second activity of uploading the document to a file sharing service. Accordingly, the first activity may be weighted higher than the second activity.

In some implementations, environment state component 108 may be configured to manage information defining project-level graphical user interfaces corresponding to the individual projects. Managing information defining project-level graphical user interfaces may include determining, obtaining, and/or modifying information used to generate project-level graphical user interfaces. Managing information defining individual project-level graphical user interfaces may include providing information to the user interface component 112 to effectuate presentation of the project-level graphical user interfaces.

In some implementations, individual project-level graphical user interfaces may include individual sets of interface elements displaying the values of one or more of the project parameters of the individual projects. Displaying the values of one or more of the project parameters of the individual projects may include determining visual representations of the values of the one or more project parameters. The visual representations may be one or more of numeric representations, graphical representations (e.g., charts, graphs, etc.), and/or other representations. In some implementations, visual representations may be direct representations. By way of non-limiting illustration, a value of a project parameter may be directly presented in a project-level graphical user interface. For example, a value of a project parameter for a project specifying that the project includes ten tasks may be represented in an interface element as "This project has ten tasks." In some implementations, visual representations may be indirect representations. By way of non-limiting illustration, a value of a project parameter may be used as a basis for determining a display that represents the value but may not directly and/or explicitly convey the value. By way of non-limiting illustration, a value of a project parameter for a project specifying that the project includes five out of ten tasks already being completed may be represented in an interface element as a pie chart that is half shaded to represent half of the project's tasks being completed.

The individual project-level graphical user interfaces may display the values of the status parameter and/or other project parameters of the individual projects. The individual project-level graphical user interfaces may include a status display portion and/or other portions. The status display portion may be a dedicated portion of the individual project-level graphical user interfaces for displaying the values of the status parameter of the individual projects.

In some implementations, the values of the status parameter of the individual projects may be presented in the individual project-level graphical user interfaces as descriptions of the activities that impact the progress toward completion of the individual projects. The descriptions of the activities may include timestamps reflecting point(s) in time that the activities occurred. The descriptions of the activities may include identifications of the user(s) performing the activities. Users may be identified based on one or more of name, username, role, and/or other information.

In some implementations, a status display portion of a project-level graphical user interface for a project may display values of the status parameter of the project in a timeline view and/or other views. In some implementations, the status display portion may include a status indictor portion. The status indicator portion may display one or more of a measure of completeness (e.g., a measure of, or derived from, the quantity of complete units of work vs total units of work), indication of on track or off track (e.g., a measure of, or derived from, the quantity of complete units of work vs a quantity of days left until a due date of the project), status updates written by users, and/or other information. The timeline view may include an ordered list and/or arrangement that shows chronological ordering of the activities that impacted the progress toward completion of the individual projects. For individual points in time on the timeline view, a description of an activity which occurred at that point in time may be presented. In some implementations, the timeline view may start at a starting point in time and end at an ending point in time. The starting point in time may correspond to one or more of a start date of the project, a creation date of the project, and/or other point in time. The ending point in time may correspond to an end date of the project. In some implementations, the ending point in time may be open ended meaning the end date of the project may be dictated based on completion of a "final" unit of work making up the project.

In some implementations, a project-level graphical user interface may include a user interface element configured to be selected by users. The selection of the user interface element may prompt a user to manually provide an update to the status of a project.

The update component 114 may be configured to automatically update the individual project-level graphical user interfaces to reflect the values of the status parameter of the individual projects in response to occurrences of the activities that impact the progress toward completion of the individual projects. The individual project-level graphical user interfaces may be updated automatically in response to the occurrences of the activities that impact the progress toward completion of the individual projects.

In some implementations, the update component 114 may be configured to determine which value(s) of the status parameter of the individual projects should be updated in individual project-level graphical user interfaces. In some implementations, the determination may be based on weighting of the activities that impact the progress toward completion of the individual projects. By way of non-limiting illustration, the update component 114 may be configured to determine that value(s) of the status parameter of the individual projects that should be updated in individual project-level graphical user interfaces include value(s) reflecting relatively higher weighted activities. In some implementations, value(s) reflecting relatively lower weighted activities may not be presented in the individual project-level graphical user interfaces. In some implementations, value(s) reflecting relatively higher weighted activities may be presented differently from value(s) reflecting relatively lower weighted activities. The differences may be based on one or more of text font, format, size, color, inclusion of graphics, and/or other features. By way of non-limiting illustration, value(s) reflecting relatively lower weighted activities may be presented in plain text, while value(s) reflecting relatively higher weighted activities may be presented with stylized text.

The update component 114 may generate and deliver status update recommendations to the individual users associated with the activities. The status update recommendations may include prompts to update the status information of the individual projects. In some implementations, the recommendations may include proposed descriptions of the activities the users completed and/or are completing. The users may provide input to confirm and/or change the status updates. In some implementations, the users may be directed to the individual project level graphical user interfaces to provide input to describes their activities. In some implementations, the recommendations may be delivered internal to the collaboration environment (e.g., pop up window) and/or external to the collaboration environment (e.g., email).

In some implementations, user interface component 112 may be configured to obtain input information and/or other information. The input information may convey user input into the user interface presented on the client computing platform(s) 104. A set of user interface elements may be provided on the user interface to facilitate the user input and/or other user interaction with the user interface. The user interface elements may include one or more of text input fields, drop down menus, check boxes, display windows, virtual buttons, and/or other elements configured to facilitate user interaction.

The update component 114 may obtain input information characterizing user input into one or more of the recommendations, the individual project-level graphical user interfaces, and/or other user interfaces. The user input may comprise the update of the individual project-level graphical user interfaces. The user input may reflect updated values of the status parameter of the individual projects. By way of non-limiting illustration, the user input may include text descriptions.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

Figure 3:
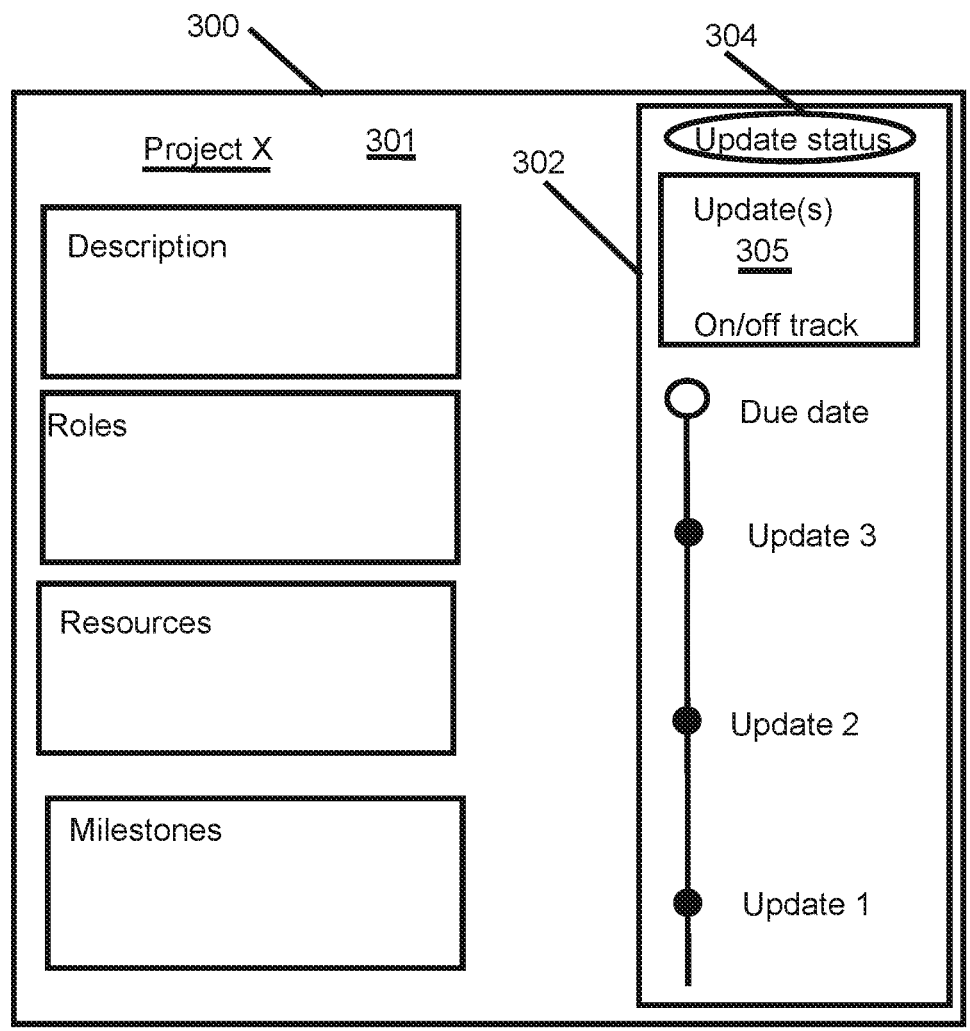
FIG. 3 illustrates a user interface, in accordance with one or more implementations.

FIG. 3 illustrates a user interface 300, in accordance with one or more implementations. The user interface 300 may include a view of a collaboration environment. In particular, the user interface 300 may show a project-level graphical user interface 301 for a project. For illustrative purposes, the project is named "Project X." The project-level graphical user interface 301 may display values of one or more project parameters. By way of non-limiting illustration, the project-level graphical user interface 301 may display one or more of project title, project descriptions, project roles, project resources, and/or other information. Also shown is a view of a status display portion 302 configured to display the values of the status parameter of the project. Within status display portion 302, values of the status parameter may be displayed in response to occurrence of activities that impact progress toward completion of the project. By way of non-limiting illustration, the status display portion 302 may present a timeline view and/or other view of the values of the status parameters to provide a chronological overview of the occurrences of activities that impact the progress of completion of the project. The status display portion 302 may include a status indicator portion 305. The status indicator portion 305 display one or more of a measure of completeness (e.g., a measure of, or derived from, the quantity of complete units of work vs total units of work), indication of on track or off track (e.g., a measure of, or derived from, the quantity of complete units of work vs a quantity of days left until a due date of the project), status updates written by users, and/or other information. In some implementations, the status indicator portion 305 may include a summary of current status aggregated from one or more recent updates.

The project-level graphical user interface 301 may include a user interface element 304 which may be selected to prompt user(s) to manually update the status with descriptions of their activities.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc. . . . ) or a drive (e.g., a disk drive, etc. . . . ). Electronic storage 128 may include one or more of optically readable storage media (e.g., optical disks, etc. . . . ), magnetically readable storage media (e.g., magnetic tape, magnetic hard drive, floppy drive, etc. . . . ), electrical charge-based storage media (e.g., EEPROM, RAM, etc. . . . ), solid-state storage media (e.g., flash drive, etc. . . . ), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
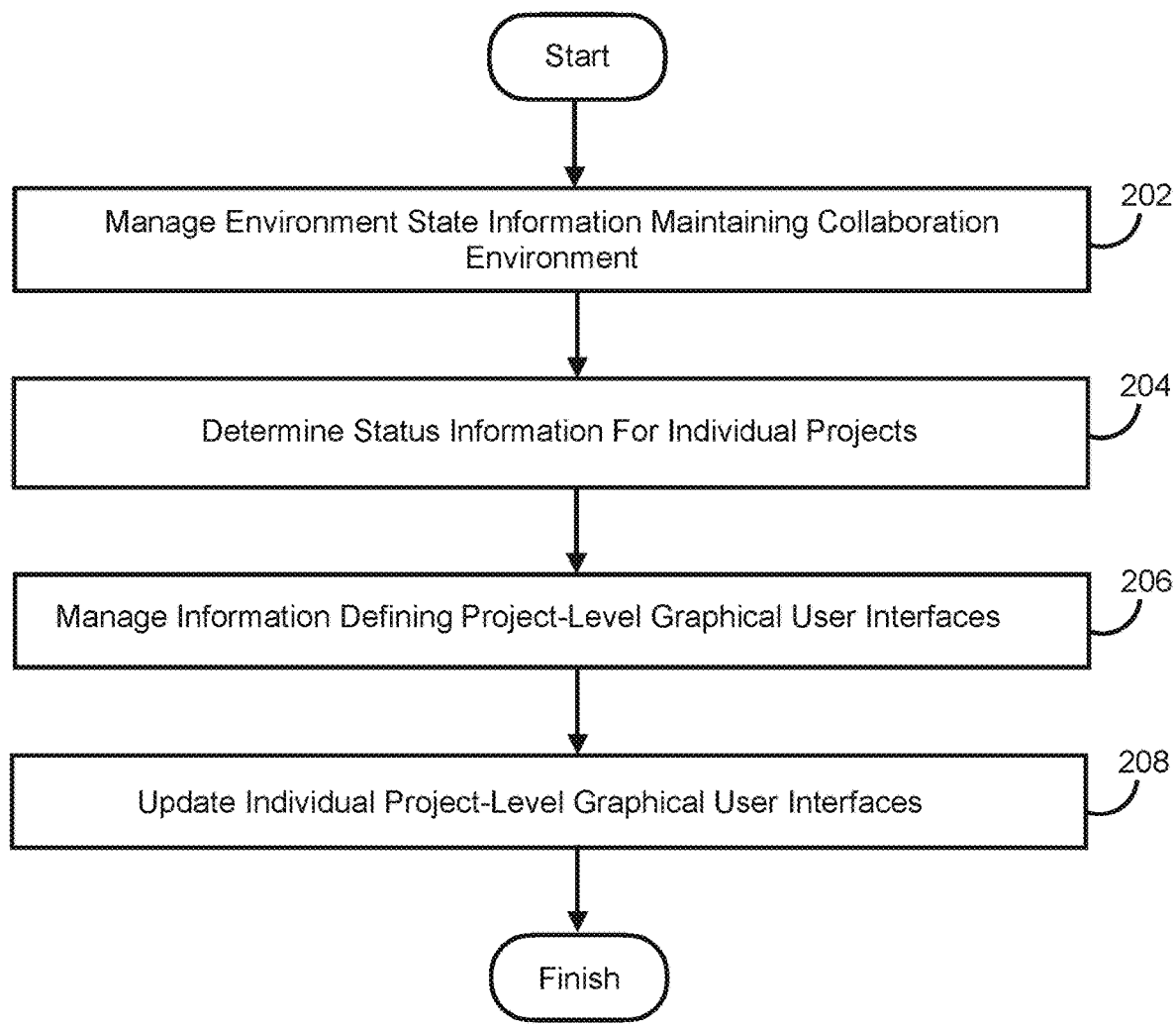
FIG. 2 illustrates a method to automatically update status of projects within a collaboration environment, in accordance with one or more implementations.

FIG. 2 illustrates a method 200 to automatically update status of projects within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include work unit records, project records, and/or other records. The work unit records may include values of work unit parameters associated with units of work managed, created, and/or assigned within the collaboration environment. The project records may include values for the project parameters associated with projects managed within the collaboration environment. An individual project may include an individual set of the units of work. Operation 202 may be performed by one or more hardware processors configured by machine-readable instructions including a component that is the same as or similar to environment state component 108, in accordance with one or more implementations.

An operation 204 may determine status information for individual projects of the collaboration environment. The status information may include values of a status parameter, characterizing individual projects by activities that impact progress toward completion of the individual projects. By way of non-limiting illustration, the activities impacting progress may include completing individual units of work included in the individual projects. Operation 204 may be performed by one or more hardware processors configured by machine-readable instructions including a component that is the same as or similar to status component 110, in accordance with one or more implementations.

An operation 206 may manage information defining project-level graphical user interfaces. The individual project-level graphical user interfaces may present the values of the status parameter of the individual projects. Operation 206 may be performed by one or more hardware processors configured by machine-readable instructions including a component that is the same as or similar to environment state component 108, in accordance with one or more implementations.

An operation 208 may update individual project-level graphical user interfaces, to reflect the values of the status parameter of the individual projects, in response to occurrences of activities that impact the progress toward completion of the individual projects. The status updates may be recommendations generated and delivered to the individual users associated with the activities. By way of non-limiting illustration, user input may comprise the update of the individual project-level graphical user interfaces reflecting updated values of the status parameter of the individual projects. Operation 208 may be performed by one or more hardware processors configured by machine-readable instructions including a component that is the same as or similar to update component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to provide a project-level graphical user interface, the system comprising:
one or more physical processors configured by machine-readable instructions to:
determine status information characterizing status of a project managed by a collaboration environment, wherein the project is associated with a project record including project information describing the project, wherein the status is characterized by activities that impact progress toward completion of the project by advancing the progress toward completion of the project, wherein the activities that impact the progress toward completion of the project include:
an upload activity comprising uploading an asset to a work unit record for a unit of work that supports fulfillment of the project, such that the uploading the asset advances the progress toward completion of the project;
a date assignment activity comprising assigning a start date or a due date to the unit of work within the work unit record that supports the fulfillment of the project, such that the assigning the start date or the due date advances the progress toward completion of the project; and
a user assignment activity comprising assigning a user to the unit of work that supports the fulfillment of the project, such that the assigning the user to the unit of work advances the progress toward completion of the project;
manage information defining a project-level graphical user interface corresponding to the project, wherein the project-level graphical user interface displays the status of the project;
effectuate presentation of the project-level graphical user interface based on the information defining the project-level graphical user interface and the status information; and
update the project-level graphical user interface to reflect updates to the status of the project in response to occurrences of the activities that impact the progress toward completion of the project.

2. The system of claim 1, wherein the project-level graphical user interface is updated automatically in response to the occurrences of individual ones of the activities that impact the progress toward completion of the project.

3. The system of claim 2, wherein the status is displayed in the project-level graphical user interface as descriptions of the activities.

4. The system of claim 1, wherein the one or more physical processors are further configured by the machine-readable instructions to:
identify individual users associated with individual activities that impact progress toward completion of the project; and
generate and deliver status update recommendations to individual client computing platforms associated with the individual users associated with the individual activities, the status update recommendations including prompts to update the status information for the project.

5. The system of claim 4, wherein the one or more physical processors are further configured by the machine-readable instructions to:
obtain input information characterizing user input into the project-level graphical user interface.

6. The system of claim 1, wherein the activities that impact the progress toward completion of the project are reflected by changes in the project record of the project, and/or changes in individual work unit records associated with the project record.

7. The system of claim 1, wherein the activities that impact the progress toward completion of the project further include:
a description updating activity comprising updating a project description of the project, such that the updating the project description of the project advances the progress toward completion of the project; and
a project-level user assignment activity comprising assigning a user as a manager of the project.

8. The system of claim 1, wherein the one or more physical processors are further configured by the machine-readable instructions to:
manage environment state information maintaining the collaboration environment, the collaboration environment being configured to facilitate interaction by users with the collaboration environment.

9. The system of claim 1, wherein the project-level graphical user interface includes a status display portion, the status display portion being a dedicated portion for displaying the status of the project.

10. The system of claim 9, wherein the status display portion further includes an indication of the project being on track or off track.

11. A method to provide a project-level graphical user interface, the method comprising:
determining status information characterizing status of a project managed by a collaboration environment, wherein the project is associated with a project record including project information describing the project, wherein the status is characterized by activities that impact progress toward completion of the project by advancing the progress toward completion of the project, wherein the activities that impact the progress toward completion of the project include:
an upload activity comprising uploading an asset to a work unit record for a unit of work that supports fulfillment of the project, such that the uploading the asset advances the progress toward completion of the project;
a date assignment activity comprising assigning a start date or a due date to the unit of work within the work unit record that supports the fulfillment of the project, such that the assigning the start date or the due date advances the progress toward completion of the project; and
a user assignment activity comprising assigning a user to the unit of work that supports the fulfillment of the project, such that the assigning the user to the unit of work advances the progress toward completion of the project;
managing information defining a project-level graphical user interface corresponding to the project, wherein the project-level graphical user interface displays the status of the project;
effectuating presentation of the project-level graphical user interface based on the information defining the project-level graphical user interface and the status information; and
updating the project-level graphical user interface to reflect updates to the status of the project in response to occurrences of the activities that impact the progress toward completion of the project.

12. The method of claim 11, wherein the project-level graphical user interface is updated automatically in response to the occurrences of individual ones of the activities that impact the progress toward completion of the project.

13. The method of claim 12, wherein the status is displayed in the project-level graphical user interface as descriptions of the activities.

14. The method of claim 11, further comprising:
identifying individual users associated with individual activities that impact progress toward completion of the project; and
generating and delivering status update recommendations to individual client computing platforms associated with the individual users associated with the individual activities, the status update recommendations including prompts to update the status information for the project.

15. The method of claim 14, further comprising:
obtaining input information characterizing user input into the project-level graphical user interface.

16. The method of claim 11, wherein the activities that impact the progress toward completion of the project are reflected by changes in the project record of the project, and/or changes in individual work unit records associated with the project record.

17. The method of claim 11, wherein the activities that impact the progress toward completion of the project further include:
a description updating activity comprising updating a project description of the project, such that the updating the project description of the project advances the progress toward completion of the project; and
a project-level user assignment activity comprising assigning a user as a manager of the project.

18. The method of claim 11, further comprising:
managing environment state information maintaining the collaboration environment, the collaboration environment being configured to facilitate interaction by users with the collaboration environment.

19. The method of claim 11, wherein the project-level graphical user interface includes a status display portion, the status display portion being a dedicated portion for displaying the status of the project.

20. The method of claim 19, wherein the status display portion further includes an indication of the project being on track or off track.

* * * * *